Nov. 19, 1963   F. B. RYAN   3,111,007
SEPARABLE CABLE TUBE FOR DITCHING AND CABLE LAYING BLADES
Filed Aug. 9, 1961   2 Sheets-Sheet 1

INVENTOR
FRANCIS B. RYAN
BY Cameron, Kerkam & Sutton
ATTORNEYS

Nov. 19, 1963  F. B. RYAN  3,111,007
SEPARABLE CABLE TUBE FOR DITCHING AND CABLE LAYING BLADES
Filed Aug. 9, 1961  2 Sheets-Sheet 2
FIG. 6.
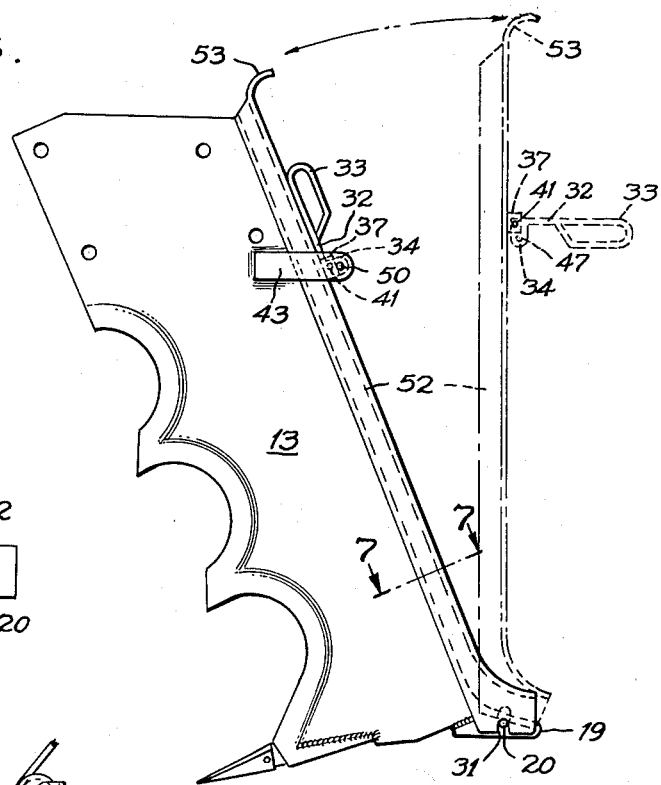
FIG. 7.
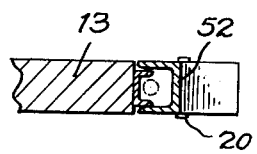
FIG. 8.
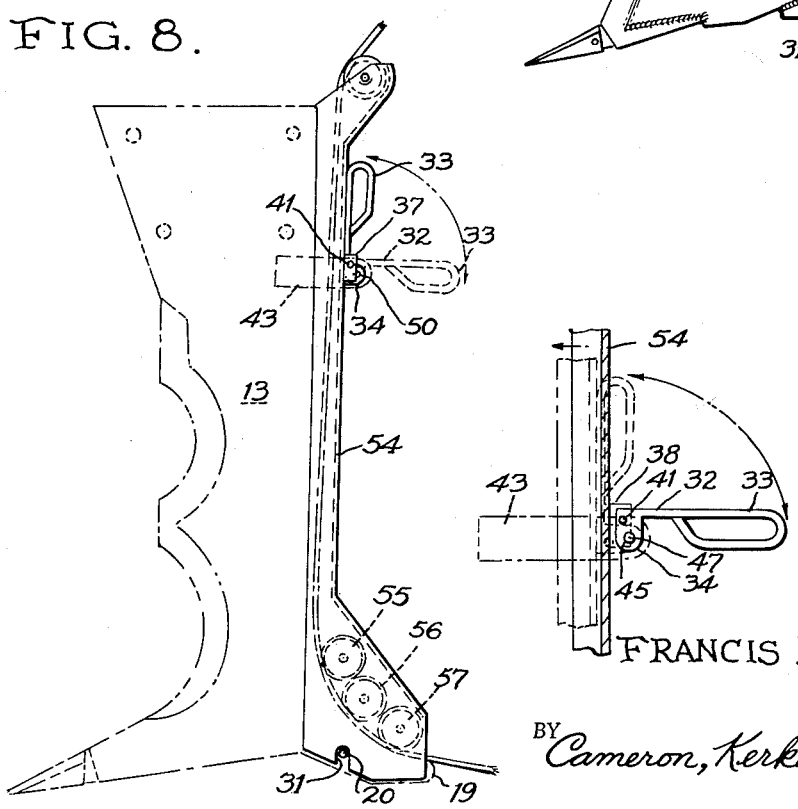
FIG. 9.
INVENTOR
FRANCIS B. RYAN
BY Cameron, Kerkam & Sutton
ATTORNEYS

United States Patent Office 3,111,007
Patented Nov. 19, 1963

3,111,007
SEPARABLE CABLE TUBE FOR DITCHING AND CABLE LAYING BLADES
Francis B. Ryan, Chariton, Iowa, assignor to F. B. Ryan Manufacturing Company, Chariton, Iowa, a corporation of Iowa
Filed Aug. 9, 1961, Ser. No. 130,316
4 Claims. (Cl. 61—72.1)

This invention relates to an improved separable cable tube structure designed to be applied over the rear edge of a ditching and cable laying blade to provide a channel down the length of the trailing edge of the blade for the passage of a cable from the cable drum on the machine into the foot of the ditch cut by the blade. The invention contemplates the provision of such a separable cable tube on the trailing edge of the blade in which the inner channel segment of the tube is affixed to the trailing edge of the blade and the outer casing of the tube is designed to fit closely over said inner channel and to be removably affixed thereto by novel pin and slot means at its base and improved clamping and retaining means at its upper extremity.

The improved separable cable tube is designed to be applied to ditching and cable laying blades of the type disclosed in my Patent No. 2,632,265 or may be applied to any of the conventional ditching and cable laying blades presently on the market.

In the normal cable laying operation when an obstruction such as a sidewalk or paved roadway is met it is desirable to remove the cable from the cable tube on the rear edge of the blade while the cut through the obstruction is being made. In the past, with conventional unitary cable tubes, it has been necessary to cut the cable at this point while the obstruction is being cut through and then to subsequently splice the cable after the cut through the obstruction has been made. Also, where it is necessary to change the size or type of wire or cable, it has in the past been necessary to cut the cable on the machine to remove it from the tube, replacing it with cable or wire of desired size. With the present separable cable tube, this operation is greatly simplified.

Various types of separable or openable cable tubes have been suggested in the past for these purposes, none of which incorporate the improved features of the present separable cable tube.

It is therefore a primary object of this invention to evolve a separable cable tube designed to be readily applied to the rear or trailing edge of a ditching or cable laying blade which is of improved strength and efficiency and which may be readily removed from or applied to the ditching blade by the expedient of throwing a clamping handle and seating or unseating the foot of the outer casing of the cable tube, mounting means therefor being provided at the lower extremity of the ditching blade.

It is another object of this invention to evolve such a structure in which the clamping means is located at the upper extremity of the tube whereby the outer casing of the cable tube may be readily removed at any stage of the ditching and cable laying operation.

It is a further object of this invention to evolve such a removable or separable cable tube which may readily be applied to existing ditching blades with a minimum of labor.

Other and further objects of this invention will become apparent as this specification proceeds.

Referring to the drawings, FIG. 1 is a partial perspective view, taken from the left rear, of a cable laying machine showing the ditching and cable laying blade in position thereon with the improved separable cable tube affixed to the trailing edge of the blade and with the cable issuing from the lower extremity of the cable tube.

FIG. 6 is a side view of a cable laying blade and another embodiment of the cable tube, partially in phantom, showing the outer casing of the cable tube in clamped position over the inner channel affixed to the trailing edge of the blade and, alternatively in phantom, showing the casing in freed position, swung outwardly from the channel in position for removal from the trailing edge of the blade;

FIG. 7 is a cross-sectional view of the blade and separable cable tube, taken on line 7—7 of FIG. 6;

FIG. 8 is a side view, partially in phantom, of another embodiment of the separable cable tube in clamped position on the trailing edge of a vertical-type ditching and cable laying blade, showing the 90° throw of the clamping lever;

FIG. 9 is a detailed cross-sectional fragmentary view partially in phantom, showing the mounting and clamping action of the pivoted clamping lever.

Figure 1:
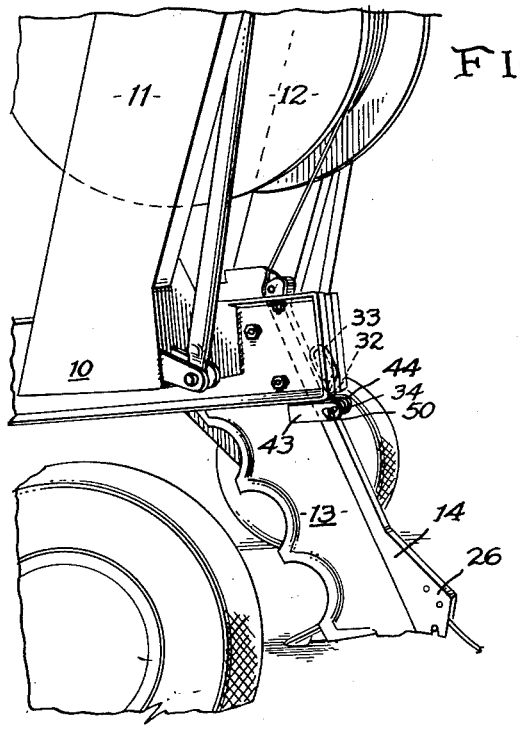

In the drawings, 10 indicates a ditching and cable laying machine provided with cable drum mounting arms 11, cable drum 12 and ditching and cable laying blade 13, to the rear or trailing edge of which is affixed, in accordance with this invention, the inner channel member and the outer, removable casing 14 of a cable laying tube. Cable is shown passing from the cable drum 12, downwardly into the cable laying tube and issuing therefrom at its lower extremity at the rear heel of the cable laying tube.

Figure 3:
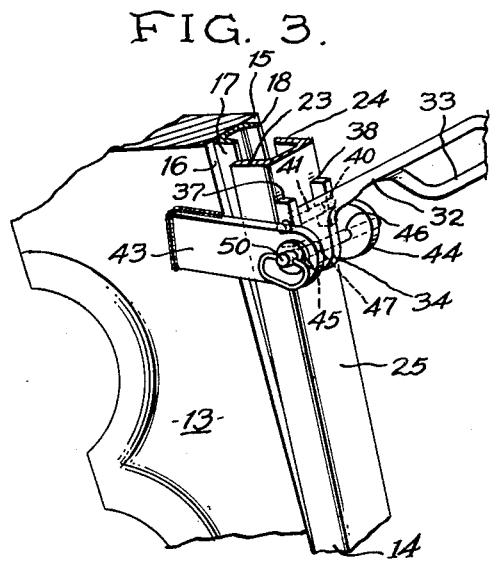
FIG. 3 is a fragmentary detailed view, broken away and in perspective of the improved separable cable tube showing the inner channel member and the outer removable casing, the clamping handle lever and its mounting structure, with the clamping lever in lowered position, freeing the casing from the inner channel.

As will be seen from FIGS. 3 and 7 of the drawings, an appropriate U-shaped and shouldered inner channel member 15 of heavy steel is welded or otherwise affixed downwardly along the rear, trailing edge 16 of the ditching and cable laying blade 13. Channel member 15 is provided with rectilinear side walls 17 and 18, inwardly spaced and appreciable distance from the lateral edges of blade 13. The inner surface of channel 15 is preferably of arcuate cross section to slidably receive a wire or cable passing downwardly from cable drum 12 along the trailing edge of ditching cable laying blade 13.

Figure 4:
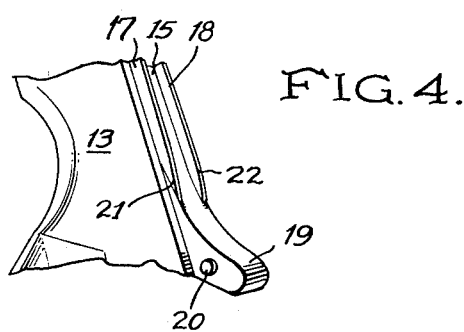
FIG. 4 is a detailed perspective view of the lower end of the inner channel, showing the heel bar and pin structure designed to receive the slotted, lower extremity of the outer casing of the cable tube.

At its lower extremity, as shown in FIG. 4, channel member 15 is brought outwardly and rearwardly into a curved heel segment 19 which is provided at its forward, lateral edges with rectangularly disposed supporting studs 20 which are preferably of cylindrical form and made integral with heel section 19 of channel 15. As shown, heel section 19 forms a rearwardly curved continuation of the lower section of channel member 15 and extends rearwardly therefrom in the plane of ditching blade 13.

As shown in FIG. 4, side walls 17 and 18 of channel member 15 terminate in downwardly curved shoulder segments 21 and 22, at the upper extremity of curved heel 19.

Channel member 15, defined by rectilinear side walls 17 and 18 is provided at its lower extremity with curved heel segment 19, and is centered on the trailing edge of blade 13 and is welded or otherwise permanently affixed thereto. Further, channel member 15 is of approximately one-third less width than blade 13 and so centered on the trailing edge of blade 13 as to provide outwardly of each of its lateral edges, adjacent walls 17 and 18, shouldered spaces for the reception of the rectilinear walls of the removable casing, which fit thereover to lie flush in the planes of the side walls of the ditching blade 13 and form a flush continuation thereof.

Figure 2:
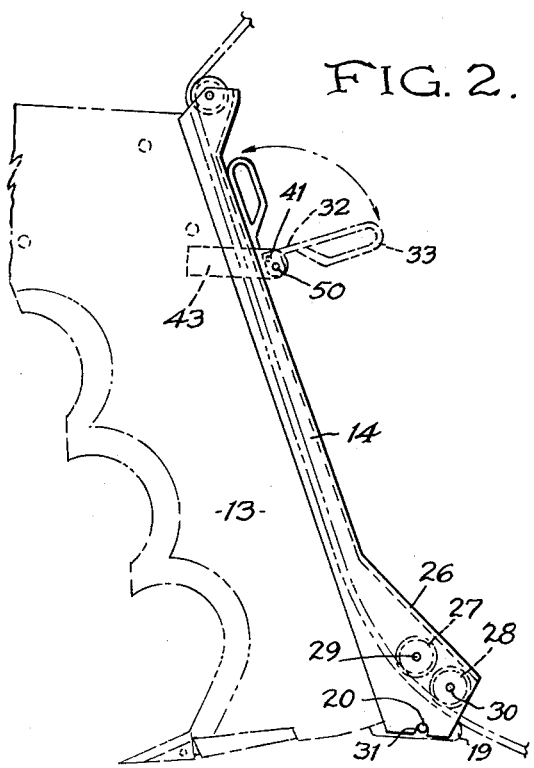
FIG. 2 is a side view, partially broken away and in phantom, of the improved removable cable tube in clamped position against the rear edge of an angular ditching and cable laying blade.
Figure 5:
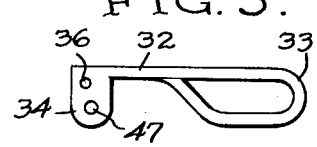
FIG. 5 is a side view of the clamping lever for the casing showing the positioning of the upper and lower lateral bores in the head thereof.

Referring to FIGS. 1, 2 and 3, the removable outer segment or casing 14 of the cable laying tube is shown and preferably constitutes a channel member of welded construction formed from high carbon abrasive resistant steel in rectangular channel shaped form provided with parallel side walls 23 and 24 so spaced as to fit closely over side walls 17 and 18 of channel 15 on the trailing edge of blade 13. Walls 23 and 24 of cable tube casing 14 closely fit over walls 17 and 18 of channel member 15 and lie flush against the shoulders at the base of walls 17 and 18 along the trailing edge of blade 13 and are of such thickness as to lie in flush planes with the lateral walls of blade 13. The upper or rear wall 25 of cable tube casing 14 is preferably of heavy bar construction to provide additional strength to the casing 14.

At its upper extremity, casing 14 is preferably widened rearwardly, as shown, to house an upper cable pulley to reduce friction at the entry end of the cable tube.

As shown in FIGS. 1 and 2, cable tube casing 14 is preferably widened and extended rearwardly at its lower extremity 26 to seat closely over heel 19 and to provide a housing for paired cable pulleys 27 and 28 which are appropriately rotatably mounted therewithin on axles 29 and 30 between walls 23 and 24 thereof. Pulleys 27 and 28 are designed to reduce friction on the cable at the lower extremity of the cable tube where it issues forth into the cut formed by ditching and cable laying blade 13. Pulleys 27 and 28 are preferably ball bearing mounted and formed of heavy gauge aluminum.

Centered in the lower lateral walls of widened extension 26 of casing 14 are vertical paired slots 31 designed to receive lateral studs 20 of heel bar 19 of cable channel 15 in such fashion that cable tube casing 14 will be rigidly supported thereon at its lower extremity when in clamped position over inner channel 15.

The clamping and retaining structure for the upper extremity of cable tube casing 14 will now be described. Clamping lever 32 is shown preferably formed of steel and recurved into a grasp section 33 at its outer extremity. At its inner extremity lever 32 is provided with a widened, downwardly extended head 34 which is rectangularly disposed to lever 32 and is curved about its lower edge 35. Laterally extending bore 36 is provided through head 34 at its upper, forward extremity. Vertical lug members 37 and 38 are provided welded or otherwise suitably affixed to the rear surface 25 of casing 14 adjacent its upper extremity. Lugs 37 and 38 are preferably parallel and are so spaced on casing 14 as to closely engage the lateral edges of head 34 of lever 32. Disposed between lugs 37 and 38 is pivot pin 41 fitting through upper bore 36 of head 34 whereby lever 32 may pivot freely therebetween on pin 41. Thus it will be seen that lever 32 is an integral part of casing 14 of the cable tube.

Welded or otherwise suitably affixed to the side walls of ditching blade 13 are paired straps or arms 43 and 44 which extend rearwardly therefrom in parallel planes. Straps 43 and 44 are so spaced as to closely fit over outer walls 23 and 24 of casing 14, in alignment with lugs 37 and 38 thereof when casing 14 is seated over channel 15. At their outer extremities straps 43 and 44 are laterally bored at 45 and 46, lever head 34 being also laterally bored at its lower extremity at 47, bores 45, 46 and 47 being in alignment when lever 32 is in lowered position and casing 14 is partially seated on channel 15, as shown in FIG. 3.

Main retaining pin 50 is shown removably fitting through bores 45 and 46 of straps 43 and 44 and through lower bore 47 of lever head 34 whereby when lever 32 is forced upwardly, pivoting on retaining pin 50 and acting against lug pin 41 on casing 14 an eccentric action will result as lever 32 is forced through an upward arc of some 90° to flush position against outer surface 25 of casing 14 to lock over center, forcing cable tube casing 14 downwardly and inwardly over walls 17 and 18 of channel 15 and locking casing 14 securely in place thereover. This locking action is clearly shown in FIGS. 3, 8 and 9 of the drawings. As lever 32 is pivotally mounted on pivot pin 41 between casing lugs 37 and 38 and between straps 43 and 44 on retaining pin 50, an upward motion of lever 32 will result in a downward and inward movement of casing 14 over channel 15, which locking action will be completed and positive when lever 32 is forced fully upwardly into flush position against rear wall 25 of casing 14.

With casing 14 so locked over channel 15, a reverse action or downward pull on lever 32 will pull casing 14 upwardly and outwardly, freeing slots 31 in its lower edges from pins 20 on heel 19 and forcing its lateral walls 23 and 24 outwardly from walls 17 and 18 of channel 15. With lever 32 in fully lowered position, removal of main retaining pin 50 from bores 45 and 46 of straps 43 and 44 and lower bore 47 of lever head 34 will completely free the outer casing 14 of the cable tube and permit its removal from the trailing edge on the blade. With casing 14 so removed from channel 15 the cable is free of the blade.

Modifications of the structure are shown in FIGS. 6 and 8. In FIG. 6 a cable tube casing is shown for attachment to an angular ditching blade, no sheaves or pulleys being utilized in this embodiment of the invention.

In FIG. 8, an embodiment is shown in which the removable cable tube casing is applied over a channel affixed to the rear edge of a vertically disposed ditching blade, one pulley being provided rotatably mounted in the upper extremity of the removable casing and three being provided rotatably mounted in its lower, enlarged heel section.

Both of these embodiments are otherwise structurally identical to the channel and removable cable tube casings previously described and shown in FIGS. 1, 2, 3 and 4 of the drawings.

In the embodiment shown in FIG. 6 removable cable tube casing 52 is formed in precisely the same fashion as the cable tube casing 14 of the embodiment of the invention shown in FIGS. 1, 2 and 3 and the shouldered channel 15 affixed to the rear edge of the blade 13 is identical to that shown in FIGS. 3 and 4 of the drawings. The only difference between this embodiment and the aforesaid embodiment lies in the fact that the cable tube pulleys have been eliminated, curved guide means 53 being provided at the upper extremity of the removable casing 52 and the cable tube channel being slightly enlarged, as shown, at the lower, rear extremity of the casing. The balance of the structure shown operates in precisely the same manner as in the embodiments shown in FIGS. 1–4, inclusive, the slots 31 at the base of casing 52 fitting over studs 20 of heel 19 at the lower ear extremity of the channel 15, as shown in FIG. 4, and the clamping lever 32 and its associated structure being identical.

The same is true of the embodiment shown in FIG. 8, all essential features of the casing 54 being identical to those shown in FIGS. 1–4, inclusive, with the exception that three pulleys 55, 56 and 57 are shown arcuately mounted in the widened heel extremity of the casing. Here again, the slotted base of the casing fits over studs 20 of heel 19, by means of slots 31 in its lateral edges and the clamping lever 32 and its supporting structure are identical to that shown in FIGS. 1–4, inclusive.

In FIGS. 8 and 9 the blade strap is in phantom in order to show the details of the off-center pivotal mounting of lever head 34 on pivot pin 41 and main retaining pin 50 disposed between the bored extremities of straps 43 and 44. It will be seen that as lever 32 is forced upwardly, pivoting on retaining pin 50 between straps 43 and 44 a powerful downward and inward force will be exerted through the upper bore of head 34 onto pin 41 between casing lugs 37 and 38 to force casing 14 downwardly and inwardly over channel 15 and to urge base slots 31 of casing 14 down over studs 20 of heel 19. Further forcing of lever 32 into flush position against wall 25 of casing 14 will thus lock casing 14 in position over channel 15. The reverse of this action occurs when lever 32 is pulled downwardly, casing 14 then being moved upwardly and outwardly from channel 15.

In all embodiments, with the cable tube casing clamped over channel 15 and fully seated by means of slots 31 over studs 20 on heel 19 at the base of the blade channel, when it is desired to remove the cable from the cable tube, it is merely necessary to grip grasp 33 of lever 32, pull lever 32 outwardly and downwardly, whereby it pivots about pin 41 disposed between lugs 37 and 38, the camming action of the lower extremity of lever head 34 pivoting on pin 50 acting to pull the casing 14 free of its close engagement with side walls 17 and 18 of blade channel 15. With handle 32 in completely lowered position, the casing 14 is swung rearwardly and upwardly, as shown in FIG. 3, slots 31 being pulled upwardly free of studs 20. Removal of retaining pin 50 from bores 45, 47 and 46 then frees the casing 14 from the blade and the cable is free therefrom.

It will be seen that due to the pivotal mounting of the upper bore 36 of lever head 34 on pin 41, between casing lugs 37 and 38, and the pivotal mounting of lower bore 47 of head 34 on retaining pin 50, between blade straps 43 and 44; when lever 32 is thrown upwardly a camming action results forcing casing 14 inwardly and downwardly over the blade channel 15. The reverse of this action occurs when lever 32 is pulled downwardly.

When lever 32 is in extreme upward position, the casing will thus be securely locked in position over the channel due to the off-setting of pivot pin 41 and main retaining pin 50 which provide an eccentric action to lock lever 32 over center. It will remain in this position until considerable force is applied to the hand loop 33 to pull lever 32 outwardly and "break" outer casing 14 free from its close engagement with the side walls of the blade channel 15.

The invention is acceptable of numerous embodiments without departing from the spirit thereof.

The shape of dimensions of the blade channel and the removable outer casing may be varied within wide limits without departing from the spirit of the invention.

Attention is directed to the appended claims for a limitation of the scope of this invention.

What is claimed is:

1. In a separable cable tube structure for ditching and cable laying blades, a cable channel defined by parallel rectilinear walls affixed downwardly along the rear edge of the blade, centered thereon and spaced inwardly from the lateral edges thereof, a curved heel affixed to the lower extremity of the blade and extending rearwardly therefrom, studs extending outwardly from the lateral edges of said heel, a removable cable tube casing of rectangular channel shape fitting over said blade channel member and closely engaging the walls thereof, paired slots in the lower, lateral walls of said cable tube casing fitting over said studs on said heel, parallel straps affixed to the sides of said blade at its upper extremity and extending rearwardly therefrom closely engaging the side walls of said removable cable tube casing, lugs on said cable casing, a pivot pin extending between said lugs, lever means provided with a depending head at its forward extremity bored to receive said pivot pin, retaining pin means passing through the bored extremities of said straps and through a lateral bore in the lower extremity of said lever head below said pivot pin whereby said removable cable tube casing will be clamped tightly over said blade channel when said lever is forced through an upward arc about said retaining pin and will be freed therefrom by a downward movement of said lever.

2. In a separable cable tube structure for ditching and cable laying blades, a cable channel defined by rectilinear walls disposed down the rear edge of the blade, a curved heel member at the rear, lower extremity of the blade defining the lower end of said channel, studs disposed at the outer surfaces of said heel, a removable casing of rectangular channel form fitting over said cable channel, slots in the lower, outer surfaces of the lower extremity of said casing fitting over said studs on said heel, paired straps affixed to the upper lateral edges of said blade and extending rearwardly therefrom in parallel planes bearing closely against the lateral edges of said casing, lugs affixed to the upper surface of said casing aligned with said straps, a pin affixed between said lugs, lever means provided with an enlarged, forwardly disposed head pivotally mounted at the upper extremity of said head on said pin and closely fitting between said lugs on said casing, a retaining pin removably disposed through aligned bores in said straps and said lever head below said lug pin whereby when said cable casing is fitted over said blade channel and said retaining pin is emplaced through the bores in said straps and said head upward movement of said lever will force said casing into fixed position over said cable channel on said blade and downward movement thereof will free said casing from said channel.

3. In a separable cable tube for ditching blades, an inner channel defined by parallel walls affixed the length of the trailing edge of the blades, a rearwardly curved heel member extending from the lower end of said channel, studs disposed at the sides of said heel, a channel shaped outer casing fitted over said channel and closely engaging its side walls, slots extending upwardly from the bottom edges of the side walls of said outer casing fitting over said studs, paired lugs affixed to the upper, rear surface of said casing, a pin laterally disposed therebetween, a lever provided with a downwardly depending head at its forward extremity pivotally mounted at its head extremity on said pin, parallel straps affixed to the sides of said blade extending rearwardly therefrom over the sides of said casing in alignment with said casing lugs, a main retaining pin passed through bores in the rear extremity of said straps and through a bore in the lower extremity of said lever head beneath said lug pin whereby upward movement of said lever will move said casing inwardly and downwardly over said inner channel and downward movement thereof will move said casing outwardly and upwardly away from said inner channel.

4. In a separable cable tube for ditching blades, an inner channel affixed to and extending the length of the rear edge of the blade, a heel member extending rearwardly from the lower end of said channel, studs disposed at the sides of said heel, a channel shaped casing fitting downwardly in close bearing relationship over said inner channel, slots extending upwardly from the bottom edges of the side walls of said casing fitting over said heel studs, a lever provided with an enlarged head pivotally mounted at its forward extremity on the upper, rear surface of said casing, paired straps extending rearwardly from the sides of said blade adjacent said lever pivot closely engaging the walls of said casing, a retaining pin passed through bores in the ends of said straps and a center bore in the head of said lever whereby upward movement of said lever will move said casing inwardly and downwardly over said channel and downward movement thereof will move said casing upwardly and outwardly therefrom.

References Cited in the file of this patent

UNITED STATES PATENTS

| | | |
|---|---|---|
| 1,226,080 | Kelly | May 15, 1917 |
| 2,038,462 | Wellman | Apr. 21, 1936 |
| 2,441,153 | Kent | May 11, 1948 |
| 2,900,931 | Lisle | Aug. 25, 1959 |